March 8, 1966 A. G. DEMBOWSKI 3,239,743
MAGNETIC RING TRANSFORMATION
Filed June 7, 1962 2 Sheets-Sheet 1

INVENTOR
ALBIN G. DEMBOWSKI
BY Donald J. Bradley
AGENT

March 8, 1966  A. G. DEMBOWSKI  3,239,743
MAGNETIC RING TRANSFORMATION
Filed June 7, 1962  2 Sheets-Sheet 2

INVENTOR
ALBIN G. DEMBOWSKI
BY Donald F. Bradley
AGENT

United States Patent Office 3,239,743
Patented Mar. 8, 1966

3,239,743
MAGNETIC RING TRANSFORMATION
Albin G. Dembowski, Bloomfield, Conn., assignor to United Aircraft Corporation, East Hartford, Conn., a corporation of Delaware
Filed June 7, 1962, Ser. No. 200,799
8 Claims. (Cl. 321—8)

This invention relates to the use of a magnetic ring for static power inversion and, particularly, to a magnetic ring utilizing a rotating magnetic field rather than a pulsating magnetic field to invert D.C. to A.C. power.

In ordinary static inverters, it is usually the object of the circuitry to generate single or three-phase sinusoidal wave shapes with harmonic content reduced to some specific level. This can be accomplished in a number of ways. Any of these well-known methods, while satisfactory, involved inverter complexity, weight, efficiency and cost. The present invention discloses a novel rotary field transformer which avoids the problems of the other methods.

It is, therefore, an object of this invention to produce a magnetic ring transformer for inverting D.C. to A.C. power.

Another object of this invention is a novel magnetic ring static inverter which will permit shaping of the output wave in the power stage of a static inverter to eliminate or reduce the need for harmonic filters.

A further object of this invention is a magnetic ring which will generate a multiphase A.C. output.

Another object of this invention is a magnetic ring transformer in which coils are wound on toothed poles similar to conventional rotary generators.

A further object of this invention is a system for regulating the voltage when two magnetic ring transformers are used to provide a three-phase output voltage.

Another object of this invention is a magnetic ring inverter which may be built as a cylindrical structure, resulting in a static inverter of minimum volume and a maximum utilization of space.

Figure 1:
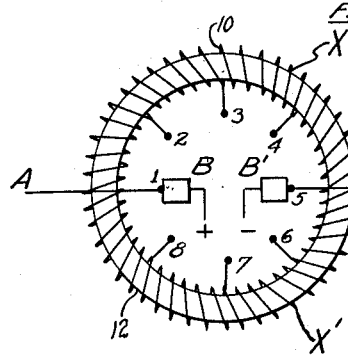
Figure 2:
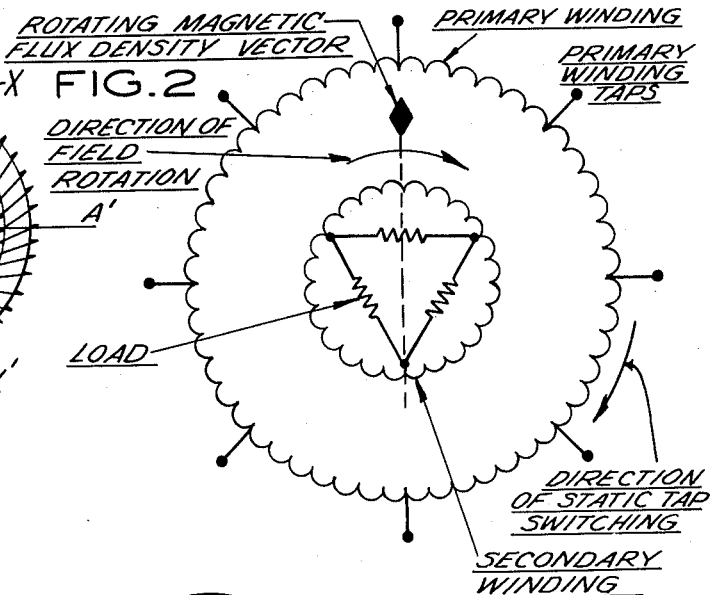
Figure 3:
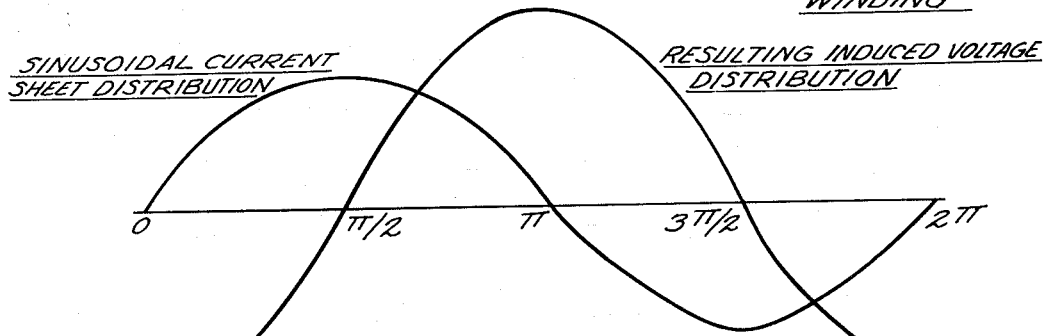
Figure 4:
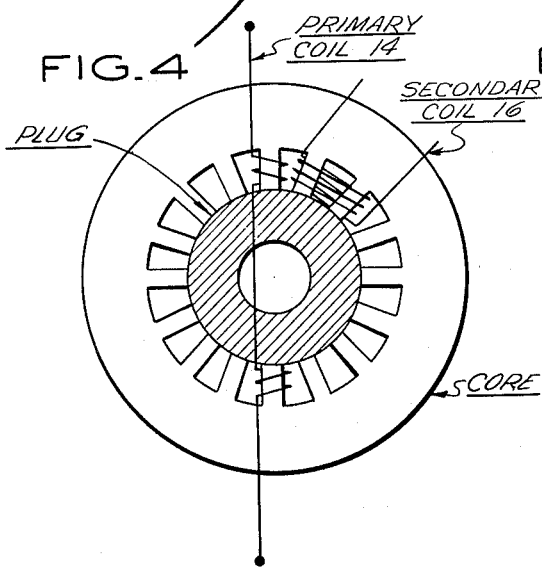
Figure 5:
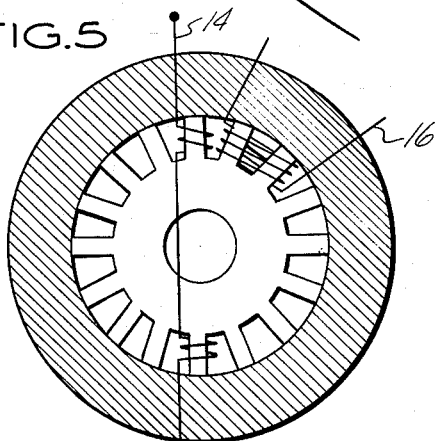
Figure 6:
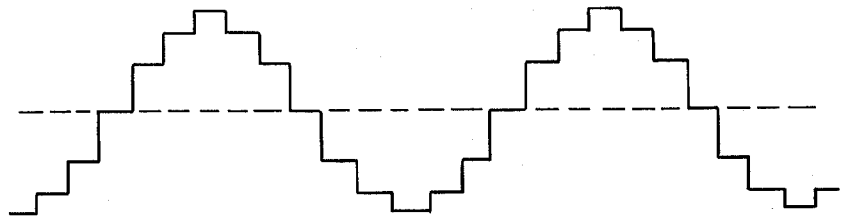
Figure 7:
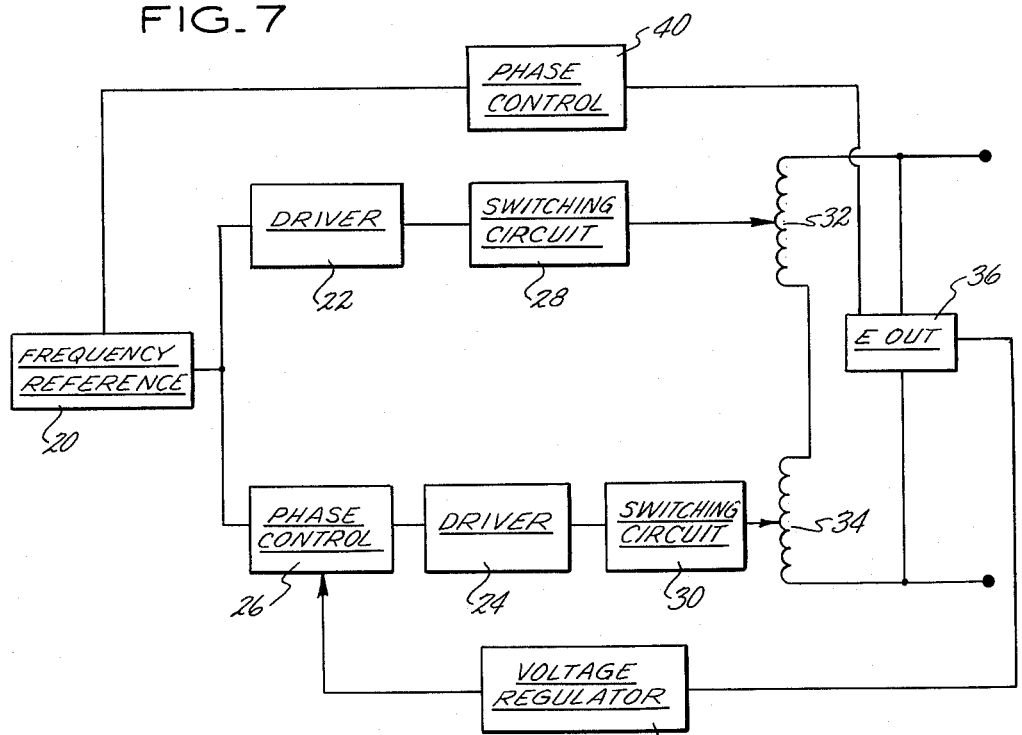
Figure 8:
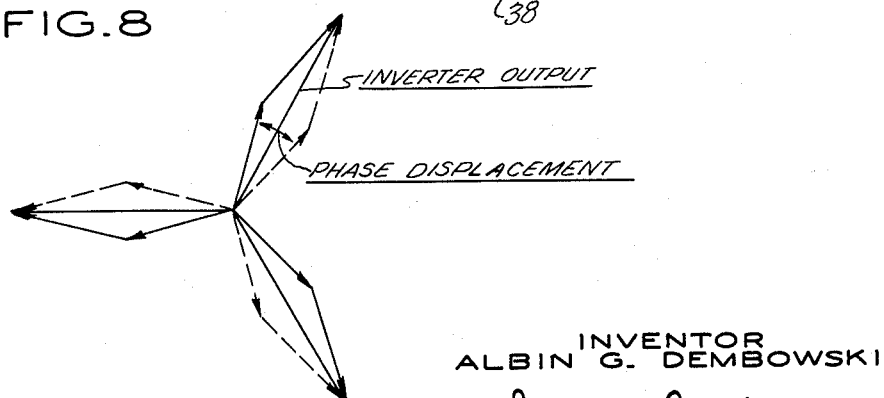

These and other objects and a fuller understanding of the invention may be had by referring to the following description and claims, read in conjunction with the accompanying drawings, in which:

FIGURE 1 shows a well-known Gramme ring which illustrates the principle of this invention; and FIGURE 2 is a schematic representation of the rotary field magnetic ring of this invention; and FIGURE 3 shows graphically the ideal current and induced voltage distribution of the magnetic ring transformer; and FIGURE 4 illustrates one embodiment of the magnetic ring transformer; and FIGURE 5 illustrates another embodiment of the invention; and FIGURE 6 graphically shows the actual spatial flux distribution generated by the magnetic ring transformer; and FIGURE 7 shows in block diagram form a system for regulating the output voltage when two magnetic ring transformers supply the output voltage; and FIGURE 8 shows vectorially the output voltage as regulated by the system of FIGURE 7.

Generally, D.C. electrical power is statically inverted to A.C. power by some type of oscillator or switching circuit which generates a pulsating magnetic flux field. To bring the A.C. power to the required degree of refinement, other circuits are also included such as voltage regulation, frequency stabilization, short circuit protection, phase control, etc. The oscillator and power amplifier functions may also be combined, but basically it is a switched or pulsating magnetic flux field cutting stationary conductors which creates an alternating voltage. After the D.C. power has been converted to A.C. power and raised to the required power level, it is usually necessary to reduce the harmonic content in the output wave shape to some low level. Ordinarily, this is accomplished by filters or techniques which prevent the generation of some specific harmonic.

If a sinusoidal output waveform is desired, the design of a filter to eliminate the undesired harmonics in the generated wave shape is extremely difficult. The filter is heavy, sometimes 50 percent of total inverter weight, and also inefficient if the load and/or power factor of the load varies greatly. To decrease the filter requirements, instead of switching a square wave into the filter, a quasi-square wave may be generated, but more complex switching circuitry is required. The filter requirements are still severe, imposing a weight, volume, and efficiency penalty on the inverter design. Going one step further, a stepped waveform may also be generated using switching circuitry with relatively good efficiency. Because the stepped wave shape more closely approaches a sinusoidal shape, the harmonic content is necessarily lower, but because of the shape of the wave, the circuit complexity is increased in order to generate and control it, thus requiring further filtering.

The generation of a pure sine wave with a sinusoidal oscillator which would be amplified to the desired power level would eliminate or reduce the need for filtering. However, in this mode the inverter active elements cannot be operated in the switching mode as they could when generating square or quasi-square wave shapes. This means that even though filter requirements have been reduced or eliminated, the transistors must have a higher power dissipation capacity and/or increased heat sinking must be added. The efficiency will be lowered in this mode of operation.

Thus, to a large extent, it is the required filter circuitry and heat sinking that cause the major weight and volume increase and loss of efficiency in a conventional static inverter design. To optimize a static inverter, it is necessary to trade off weight, volume, and efficiency against one another and reach an acceptable configuration.

The rotary field principle of this invention involves a static inversion technique which inherently presents the more optimum design techniques. Fundamentally, instead of generating a time varying voltage in a stationary coil with a time varying flux, the time varying voltage is generated by a spatial flux distribution moving past stationary windings. Further, if the rotating spatial distribution of flux density is made to have a sinusoidal shape, the voltage induced will have a sinusoidal variation with time. This would thus eliminate the need for harmonic filters, as is true also with an alternator. The problem then is the generation of the rotating magnetic flux field with a spatial distribution as nearly sinusoidal as possible while still using transistors in their switching mode.

FIGURE 1 shows a well-known Gramme ring which will provide a simple circuit to show the basic principles involved. A coil 10 is wound on a toroidal magnetic iron structure 12. Terminals A and A' are connected at opposite sides of coil 10. A plurality of equally spaced taps are also brought out from coil 10, the taps being numbered 1 through 8. Any number of taps may be provided as will be expalined in detail later. B–B' are brushes which rotate simultaneously. The brushes are powered by an outside source of rotary power (not shown). The sequence of the brushes during rotation is taps 1–5, 2–6, 3–7, etc. A direct current from an outside source is applied to the brushes B and B'. As the brushes rotate, the voltage observed across terminals A–A' will vary in approximate sinusoidal fashion with the rotation of the brushes. In fact, the voltage A–A' will consist of a series of rising and falling steps as shown in FIGURE 6. The smoothness of the waveform will improve as the number of terminals is increased.

For inverter applications, the brushes would be replaced with a source of voltage to provide a stepped waveform to the taps. Semi-conductors such as transistors, SCR's, or four layer diodes are preferred, but any source such as vacuum tubes may also be used. Each coil terminal 1 through 8 would connect to a suitable switching source. By switching the sources in pairs in the sequence shown for the brushes, a similar sinusoidal output will result from the applied D.C. voltage to the semi-conductors.

Locating the output connectors in the manner shown in FIGURE 1 as A, X and X' at 120 degree displacements will provide a three-phase output. Any combination of connections may be made to obtain any number of phases.

The semi-conductors may be switched as equally spaced multiple pairs. The results in this case will be equivalent to a multipole rotary device, that is, a frequency output is obtained which is a pole pair multiple of the switching frequency. Thus for two pairs of semi-conductors switching simultaneously, the switching frequency of each pair of transistors will now be one-half of the output frequency. Reduction of the switching frequency will permit more efficient operation of the semi-conductors.

Switching of the semi-conductors in the magnetic ring circuit of FIGURE 1 can be accomplished by multivibrator type driver circuits synchronized by a suitable frequency reference or any other type of driver. The circuits used for driving are not part of this invention and will not be described.

The magnetic ring configuration is not limited to the one shown in FIGURE 1. The figure illustrates that the approach used in this invention is to establish a rotating magnetic flux field by systemically switching taps, using transistors or other devices operating in a switching mode, on a set of primary windings wound on a basically cylindrical iron structure.

FIGURE 2 shows schematically the operation of the rotary field magnetic ring and FIGURE 4 shows a more complex configuration which is obtained by winding coils on toothed poles in the manner of more conventional rotary generators. This permits isolating primary and secondary windings which can step up or step down the output voltage with respect to the switched D.C. voltage. The primary windings 14 are wound using techniques which produce a nearly sinusoidal flux density distribution. A set of secondary windings 16 is placed on the same iron structure so that the rotating flux field generated by sequentially switching power to the primary windings 14 induces time voltage variations in the secondary windings. The coils can be wound in any distributed manner known to the art. Only one primary winding 14 and one secondary winding 16 are shown in FIGURE 4, and it is obvious that the arrangement shown will not produce a sine wave flux distribution, but it is understood that the actual inverter will include many such primary windings and one or more secondary windings as desired, and that the manner of winding will vary with the application of the inverter.

FIGURE 5 is an inverter similar to FIGURE 4 but with the teeth being fabricated from the plug rather than from the ring. Other toothed structures may be used, but the structure of FIGURE 4 is fairly easy to fabricate, as is true of any open tooth construction. Flux density and mechanical considerations in a many toothed structure might result in a hole in the center of structure as shown in FIGURES 4 and 5. The hole could be used for installing electronic switching circuitry to conserve space.

In addition to the use of the structures as a static inverter, the method described may also be used as a brushless variable horsepower, constant torque, vairable speed motor. If the second set of windings and core plug are replaced by a rotating armature, the rotating magnetic flux field will induce currents in the armature which, because of the reaction field produced, will cause the armature to rotate. It also appears practical, by suitable winding methods and tap switching logic, to generate rotating flux distributions which simulate the characteristics of many motors of different speeds in one unit.

The testing of units as shown in FIGURES 4 and 5 has shown that poor choices of copper to iron ratios and winding distribution may result in a high leakage inductance. Poor efficiency may also result if a small copper cross section of the windings is used. Calculations show that copper losses are nearly equal to the total losses, that the actual efficiency of the device is over 95 percent, and that there are no windage losses to reduce efficiency, as in rotary machines.

If the spatial magnetic flux density distribution is not sinusoidal, harmonic spatial components will exist. Such spatial harmonics will, in general, produce time harmonics in the output voltage which may necessitate additional filtering. Therefore, steps must be taken to closely control the flux density distribution so as to reduce harmonic content to the desired level. This can be accomplished by controlling the current sheet which produces it. No current sheet actually exists due to the finite size of the wire, but by decreasing the wire and increasing the number, it is quite possible to synthesize a current distribution to any degree. FIGURE 3 shows the ideal sinusoidal spatial current distribution and the resulting induced voltage distribution.

FIGURE 6 shows the flux density that theoretically should result from the current distribution in the primary winding. From this figure it can be seen that the flux density distribution is not truly sinusoidal so that some time harmonics will be generated. By use of other winding configurations, these harmonics can be reduced to any desired level.

To improve the stability of flux density distribution under unbalanced loading conditions, two taps may be energized simultaneously on the primary winding. This is called two points of application. The use of four points of application will further improve flux stability under unbalanced loading of the secondary winding.

One distinct advantage of a magnetic ring inverter is the ability of the structure to maintain phase relationship in a multiphase unit, in the manner of rotary electrical machines. FIGURES 7 shows a voltage regulating scheme utilizing two magnetic ring structures. A frequency reference circuit 20 supplies a signal to the driver stages 22 and 24 of two separate magnetic rings. The driver stages provide the timing of the system, so that the magnetic rings are switched at the same frequency. A phase control circuit 26 varies the phase of driver 24 by advancing or retarding the output of this stage. Each driver also has a switching circuit 28 and 30 connected with it. The output voltages of the magnetic rings 32 and 34 are combined additively. FIGURE 8 shows that the resultant voltage will be the vector sum of the two output voltages. The magnitude of the resultant vector can be controlled by adjusting the phase angle between the individual output voltage vectors. The vector output voltage is sensed by circuit 36 and fed to a voltage regulator circuit 38 which compares the actual output voltage amplitude with the optimum output voltage. A zener diode reference may be used in voltage regulator 38. An error signal is generated and is fed to phase control circuit 26 which controls the switching point of the variable ring. FIGURES 7 and 8 show the regulating circuitry as being applied to a three-phase output, but it is understood that any number of inverter phases can be regulated.

The object of the regulation is to keep the inverter outputs at a fixed voltage amplitude regardless of load or circuit changes. The vector sum of the outputs is measured, and when the output varies from the desired value, the phase of one of the inverters is increased or decreased relative to the other inverter to thereby produce a vector sum output which is constant. As may be seen, when the phase of one inverter is changed relative to the other, the resultant vector will shift in phase also. However, for the three phase device with a balanced output, each phase will shift the same amount so that the phases remain 120° apart. For an unbalanced load or other conditions which will cause a phase shift in only one phase, a phase control 40 in FIGURE 7 is needed to sense any phase shifts in the vector output and vary the frequency reference 20 to thereby regulate the phase symmetry of the three phase output. Feedback may be required in both the voltage regulator and phase control loops for stability.

Inasmuch as the magnetic ring is a magnetically wound structure, it will have a certain amount of leakage reactance. This reactance is inductive in nature and can be tuned by means of capacitors. The advantage of capacitive tuning is that it will serve to filter out the discrete steps of voltage shown in FIGURE 6 to produce an essentially clean sine wave.

Static inverters with conventional transformers usually are of rectangular shape and are not readily interchangeable with rotary units. The magnetic ring of this invention pemits a cylindrical structure resulting in a static inverter of minimum volume and maximum space utilization. The cylindrical form also permits direct installation of this type of static inverter in the space allotted to rotary inverters already in operation.

Although the invention has been described with a certain degree of particularity, it is understood that the present disclosure has been made only by way of example and that numerous changes in the details of construction and the combination and arrangement of parts may be resorted to withoutt departing from the spirit and the scope of the invention as hereinafter claimed.

I claim:
1. Apparatus for inverting D.C. voltage into A.C. voltage and maintaining a constant amplitude output comprising first and second magnetic ring inverters, each inverter having a toothed core of magnetic material with a plurality of primary coils wound upon said core teeth, each of said primary coils being wound upon at least one of said core teeth, at least one secondary coil wound upon said core teeth, static switching circuit means for sequentially supplying signals to said primary coils to produce a rotating magnetic flux vector in said core, said secondary coil being responsive to said vector to produce an A.C. output voltage in said secondary winding, means to connect the secondary windings of said first and second inverters and thereby combine the A.C. output voltage of said inverters in vectorial additive relationship, means for sensing the combined A.C. output voltage amplitude and comparing said combined output voltage with a datum signal to produce an amplitude error signal when said output voltage amplitude deviates from said datum, and means including a control circuit responsive to said error signal for shifting the phase of one of said magnetic ring inverter outputs to thereby control said combined output amplitude.

2. Apparatus as in claim 1 wherein said control circuit includes means for selectively varying the time of application of said signals from said static switching circuit means to the primary coils of one of said inverters.

3. Apparatus for inverting D.C. voltage into multiphase A.C. voltage and maintaining a constant phase and amplitude output comprising first and second magnetic ring inverters, each inverter having a toothed core of magnetic material with a plurality of primary coils wound upon said core teeth, each of said primary coils being wound upon at least one of said core teeth, secondary coil means wound upon said core teeth, static switching circuit means for sequentially supplying signals to said primary coils to produce a rotating magnetic flux vector in said core, said secondary coil means being responsive to said vecotor to produce a multiphase A.C. output voltage, means to combine said first and second inverter output voltages in vectorial additive relationship, means for sensing the combined output voltage amplitude and comparing said voltage with a datum signal to produce an error signal when said combined output voltage amplitude deviates from said datum signal, means including a control circuit responsive to said error signal for shifting the phase of the entire multiphase output from one of said inverters to control the amplitude of said combined output voltage, means for sensing the phase shift of said combined output, and means responsive to said sensing means for varying the phase of both said inverter output voltages to thereby control the phase of said combined output.

4. A static electrical inverter for inverting a D.C. input voltage to an A.C. output voltage comprising
an annular magnetizable core having a plurality of equally spaced pole teeth disposed around said core,
a plurality of primary windings wound in pairs on said pole teeth, each pair of windings being connected in series on opposite pole teeth to a respective pair of input terminals,
secondary windings wound on said pole teeth and connected to output terminals,
and static electrical switch means arranged to simultaneously apply rectangular waveform voltages to a plurality of pairs of said input terminals and to sequentially and cyclically switch said pairs of terminals to thereby produce in said core a substantially sinusoidal magnetic field having a plurality of pairs of magnetic poles and rotating at a substantially constant speed,
said magnetic field inducing in said secondary windings a substantially sinusoidal output voltage having a frequency which is a multiple of the speed of rotation of the magnetic field in said core.

5. A static inverter as in claim 4 in which said annular magnetizable core comprises
an annular magnetizable outer core,
a magnetizable inner core,
and pole teeth around the periphery of one of the inner or outer cores extending radially toward the other outer or inner core so that the latter forms a return path for magnetic flux in the pole teeth.

6. A static inverter as in claim 5 in which the inner core is annular, and wherein at least part of said electrical switch means is housed within said inner core.

7. A static inverter as in claim 5 wherein said pole teeth form part of the outer core and extend radially inwardly to the inner core.

8. A static inverter as in claim 5 wherein said pole teeth form part of the inner core and extend radially outwardly to the outer core.

References Cited by the Examiner
UNITED STATES PATENTS

| | | | |
|---|---|---|---|
| 433,758 | 8/1890 | Zipernowsky et al. | 321—49 |
| 613,205 | 10/1898 | Hutin et al. | 321—8 |
| 880,705 | 3/1908 | Woodbridge | 321—49 |
| 1,089,077 | 3/1914 | Price | 321—49 |
| 1,191,759 | 7/1916 | Cabot | 321—5 |
| 1,667,242 | 4/1928 | Calverley et al. | 321—5 |
| 2,468,569 | 4/1949 | Mead | 321—61 |
| 3,118,106 | 1/1964 | Robinson | 321—49 |

LLOYD McCOLLUM, *Primary Examiner.*

G. J. BUDOCK, J. C. SQUILLARO, *Assistant Examiners.*